US008684816B2

(12) United States Patent
Ajiro

(10) Patent No.: US 8,684,816 B2
(45) Date of Patent: Apr. 1, 2014

(54) SLOT MACHINE DISPLAYING RENDERED EFFECTS BASED ON PROPORTION OF PAYOUT AMOUNT TO BET AMOUNT

(75) Inventor: Arata Ajiro, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 734 days.

(21) Appl. No.: 12/210,447

(22) Filed: Sep. 15, 2008

(65) Prior Publication Data

US 2009/0082089 A1 Mar. 26, 2009

(30) Foreign Application Priority Data

Sep. 21, 2007 (JP) ................................ 2007-244620

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ........ 463/20; 463/7; 463/16; 463/25; 463/29; 463/42; 273/143 R

(58) Field of Classification Search
USPC ............. 273/143 R; 463/7, 16, 20, 25, 29, 42
See application file for complete search history.

(56) References Cited

U.S. PATENT DOCUMENTS

| | | | | |
|---|---|---|---|---|
| 5,603,659 A * | 2/1997 | Okada | 463/25 |
| 6,234,897 B1 * | 5/2001 | Frohm et al. | 463/20 |
| 6,517,433 B2 | 2/2003 | Loose et al. | |
| 6,960,134 B2 * | 11/2005 | Hartl et al. | 463/20 |
| 2001/0009865 A1 * | 7/2001 | Demar et al. | 463/20 |
| 2002/0128058 A1 * | 9/2002 | Rubeli | 463/20 |
| 2002/0175466 A1 * | 11/2002 | Loose et al. | 273/143 R |
| 2003/0236116 A1 * | 12/2003 | Marks et al. | 463/16 |
| 2004/0018865 A1 * | 1/2004 | Gilmore et al. | 463/7 |
| 2004/0171423 A1 * | 9/2004 | Silva et al. | 463/31 |
| 2007/0135199 A1 * | 6/2007 | Chen | 463/16 |

* cited by examiner

*Primary Examiner* — Adetokunbo O Torimiro
(74) *Attorney, Agent, or Firm* — Lexyoume IP Meister, PLLC.

(57) ABSTRACT

A slot machine includes a display device, reels, a bet unit, motors, a memory, and a controller. The controller is configured to: (a) execute a lottery in response to an accepted bet; (b) send a signal indicating an instruction for rotating each reel to each motor; (c) determine an amount of credits to be awarded to a player in accordance with the lottery result; (d) determine an image to be displayed on the display device in accordance with a proportion of the amount of credits to the accepted bet; (e) cause the display device to display the image determined in (d); (f) send a signal indicating an instruction for causing each reel to come to a stop to each motor in accordance with the lottery result; and (g) when each reel comes to a stop, award the amount of credits determined in (c) to the player.

2 Claims, 13 Drawing Sheets

FIG. 8

SYMBOL LAYOUT TABLE

| SYMBOL LAYOUT | SYMBOLS | | | | |
|---|---|---|---|---|---|
| | FIRST REEL | SECOND REEL | THIRD REEL | FOURTH REEL | FIFTH REEL |
| 20 | BONUS | BONUS | BONUS | BONUS | BONUS |
| 19 | A | MASK | Q | A | 10 |
| 18 | HOLY CUP | K | K | TREASURE | SNAKE |
| 17 | TREASURE | COMPASS | 10 | Q | HOLY CUP |
| 16 | Q | MASK | K | K | J |
| 15 | 10 | Q | TREASURE | MASK | TREASURE |
| 14 | HOLY CUP | HOLY CUP | HOLY CUP | BONUS | WILD |
| 13 | MASK | J | J | Q | Q |
| 12 | 10 | BONUS | BONUS | SNAKE | HOLY CUP |
| 11 | TREASURE | HOLY CUP | TREASURE | 10 | A |
| 10 | WILD | A | WILD | WILD | WILD |
| 9 | BONUS | Q | COMPASS | 10 | A |
| 8 | MASK | WILD | A | BONUS | BONUS |
| 7 | J | A | 10 | Q | TREASURE |
| 6 | HOLY CUP | J | J | COMPASS | MASK |
| 5 | TREASURE | K | HOLY CUP | Q | 10 |
| 4 | A | TREASURE | TREASURE | K | TREASURE |
| 3 | Q | A | WILD | Q | K |
| 2 | COMPASS | HOLY CUP | TREASURE | HOLY CUP | COMPASS |
| 1 | 10 | TREASURE | K | A | TREASURE |
| 0 | K | Q | TREASURE | Q | MASK |

BASIC GAME PAYOUT TABLE

| SYMBOLS | NUMBER OF COINS TO BE PAID OUT | | |
|---|---|---|---|
| | BET AMOUNT 1 | BET AMOUNT 2 | BET AMOUNT 3 |
| | 0 | 0 | 0 |
| WILD | 200 | 400 | 600 |
| SNAKE | 100 | 200 | 300 |
| TREASURE | 100 | 200 | 300 |
| MASK | 50 | 100 | 150 |
| HOLY CUP | 50 | 100 | 150 |
| COMPASS | 10 | 20 | 30 |
| A | 10 | 20 | 30 |
| K | 2 | 4 | 6 |
| Q | 2 | 4 | 6 |
| J | 2 | 4 | 6 |
| 10 | 1 | 2 | 3 |

FIG. 12

EFFECT NUMBER DETERMINATION TABLE

| | EFFECT NUMBER | | |
|---|---|---|---|
| PAYOUT AMOUNT/ BET AMOUNT | 1 | 2 | 3 |
| 200 | 5% | 15% | 80% |
| 100 | 10% | 20% | 70% |
| 50 | 20% | 20% | 60% |
| 10 | 20% | 30% | 50% |
| 2 | 60% | 40% | 50% |
| 1 | 100% | 0% | 0% |

FIG. 13

EFFECT TABLE

| EFFECT NUMBER | EFFECT MODE |
|---|---|
| 1 | NORMAL SPIN |
| 2 | UPWARD SPIN |
| 3 | FLYING AIRPLANE |

SLOT MACHINE DISPLAYING RENDERED EFFECTS BASED ON PROPORTION OF PAYOUT AMOUNT TO BET AMOUNT

This application is based on and claims the benefit of priority from Japanese Patent Application No. 2007-244620, filed on 21 Sep. 2007, the content of which is incorporated herein by reference.

BACKGROUND OF THE INVENTION

1. Field of the Invention

This invention relates to a slot machine that displays rendered effects on the basis of a proportion of a payout amount to a bet amount.

2. Related Art

A conventional slot machine starts a game with a predetermined bet amount, starts the rotation of a plurality of reels each having a plurality of symbols, and stops the rotation of the plurality of reels after a predetermined period of time. Slot machines are known, which provide an award after the abovementioned steps in accordance with the combination of the symbols statically displayed.

In addition, as disclosed in U.S. Pat. No. 6,517,433, to solve a problem of a stereotyped and monotonous display unit, a video display is installed in front of reels so as to overlay rendered images in association with the reels, including information relating to a game, thus providing novel and powerful effects for the game.

However, the slot machine disclosed in U.S. Pat. No. 6,517,433 does not provide effects notifying a player of the relationship between a payout amount and a bet amount, during a period between the start of a game and the end of the rotation of the reels. Since the same effects are provided regardless of bet amounts, the player may have difficulty anticipating an amount to be gained, distinguishing between 1 bet and 50 bets for an occurrence of an award of 100 credits.

An objective of the present invention is to provide a slot machine producing effects notifying the relationship between a payout amount and a bet amount, in other words the information helpful for a player to predict an actual gain, during a period between the start of a game and the end of the rotation of reels.

Another objective of the present invention is to provide a slot machine with improved entertainment properties.

SUMMARY OF THE INVENTION

To solve the abovementioned problems, the present invention provides the following.

In an aspect of the present invention, a slot machine is provided, which includes a display device, a plurality of reels, a bet unit, a plurality of motors, a memory, and a controller. Each of the plurality of reels has a plurality of symbols on its circumferential surface. The bet unit accepts a bet placed on a game by a player. The plurality of motors rotationally drives and causes the plurality of reels to come to a stop, respectively. The memory stores the bet accepted by the bet unit. The controller is configured to: (a) execute a lottery in response to the bet accepted by the bet unit; (b) send a signal indicating an instruction for rotationally driving each of the plurality of reels to each of the plurality of motors; (c) determine an amount of credits to be awarded to the player in accordance with a result of the lottery; (d) determine an image to be displayed on the display device in accordance with a proportion of the amount of credits to the accepted bet; (e) cause the display device to display the image determined in (d); (f) send a signal indicating an instruction for causing each of the plurality of reels to come to a stop to each of the plurality of motors in accordance with the result of the lottery; and (g) when each of the plurality of reels comes to a stop, award the amount of credits determined in (c) to the player.

The slot machine described above starts the rotation of the reels in response to the acceptance of the bet, determining the amount of credits to be paid to the player in accordance with the result of the lottery. In addition, the slot machine determines the image to be displayed on the display device according to the proportion of the amount of credits to be awarded to the accepted bet, causing the display device to display the determined image and the rotation of each reel to come to a stop.

Since the slot machine performs the display of the rendered effects according to the proportion described above, it allows the player to see the image of the rendered effects during the period between the start of the rotation of the reels to the end of the rotation. In this way, the player can grasp his/her gains according to the information related to the relation between the amount of credits to be awarded and the amount of bet.

In another aspect of the present invention, a slot machine is provided, in which the image determined in (d) described above is selected from a plurality of images in accordance with the result of the lottery.

The slot machine selects an image out of the plurality of images according to the result of the lottery in addition to the proportion of the amount of credits to be awarded to the amount of bet.

Since the slot machine determines the rendered effects according to not only the proportion but also the result of the lottery, it is possible to augment the variation of the rendered effects. This augmented variation does not allow the player to fully grasp his/her coming gains. In this way, the player has another fun of predicting his/her gains.

In still another aspect of the present invention, a slot machine is provided, which includes a display device, a bet unit, a memory, and a controller. The display device performs rotational and statical displays of a plurality of symbols. The bet unit accepts a bet placed on a game by a player. The memory stores the bet accepted by the bet unit. The controller is configured to: (a) execute a lottery in response to the bet accepted by the bet unit; (b) cause the display device to perform a rotational display of the plurality of symbols; (c) determine an amount of credits to be awarded to the player in accordance with a result of the lottery; (d) determine an image to be displayed on the display device in accordance with a proportion of the amount of credits to the accepted bet; (e) cause the display device to display the image determined in (d); (f) cause the display device to perform a statical display of the plurality of symbols in accordance with the result of the lottery; and (g) when the plurality of symbols comes to a stop, award the amount of credits determined in (c) to the player.

The slot machine described above starts the rotational display of the plurality of symbols in response to the acceptance of the bet, determining the amount of credits to be paid to the player in accordance with the result of the lottery. In addition, the slot machine determines the image to be displayed on the display device according to the proportion of the amount of credits to be awarded to the accepted bet, causing the display device to display the determined image and the statical display of the plurality of symbols.

Since the slot machine performs the display of the rendered effects according to the proportion described above, it allows the player to see the image of the rendered effects during the period between the start of the rotational display to the statical display of the plurality of symbols. In this way, the player can grasp his/her gains according to the information related to the relation between the amount of credits to be awarded and the amount of bet.

According to the present invention, a slot machine performs a display of rendered effects that vary according to the relationship between a payout amount and a bet amount, based on which a player can predict his/her gains, during a period between the start of a game and the end of the rotation of reels.

In addition, the present invention can also provide the slot machine with improved entertainment properties.

BRIEF DESCRIPTION OF THE DRAWINGS

FIG. 8 is a diagram showing a symbol layout table according to the preferred embodiment of the present invention;

FIG. 12 is a diagram showing a table for determining an effect number according to the preferred embodiment of the present invention;

FIG. 13 is a diagram showing an effect table according to the preferred embodiment of the present invention;

DETAILED DESCRIPTION OF THE INVENTION

A preferred embodiment of the present invention is hereinafter described in detail with reference to the accompanying drawings.

A slot machine 13 according to the present embodiment operates in the following manner: It performs a lottery of random numbers in response to a bet accepted by a BET switch 23, and submits a signal for rotating reels 3A to 3E to a motor driving circuit 120. Subsequently, it determines a credit amount to be paid out to a player on the basis of a result of the lottery, determining an image to be displayed on a liquid crystal display 30 on the basis of a proportion of a credit amount to be paid out to the player to a bet amount accepted. Subsequently, it displays the determined image on the liquid crystal display 30, and submits a signal for stopping the rotation of the reels 3A to 3E to the motor driving circuit 120 on the basis of the result of the lottery. In this way, it pays out the credit amount to the player in response to the reels 3A to 3E, which have come to rest.

Figure 1:
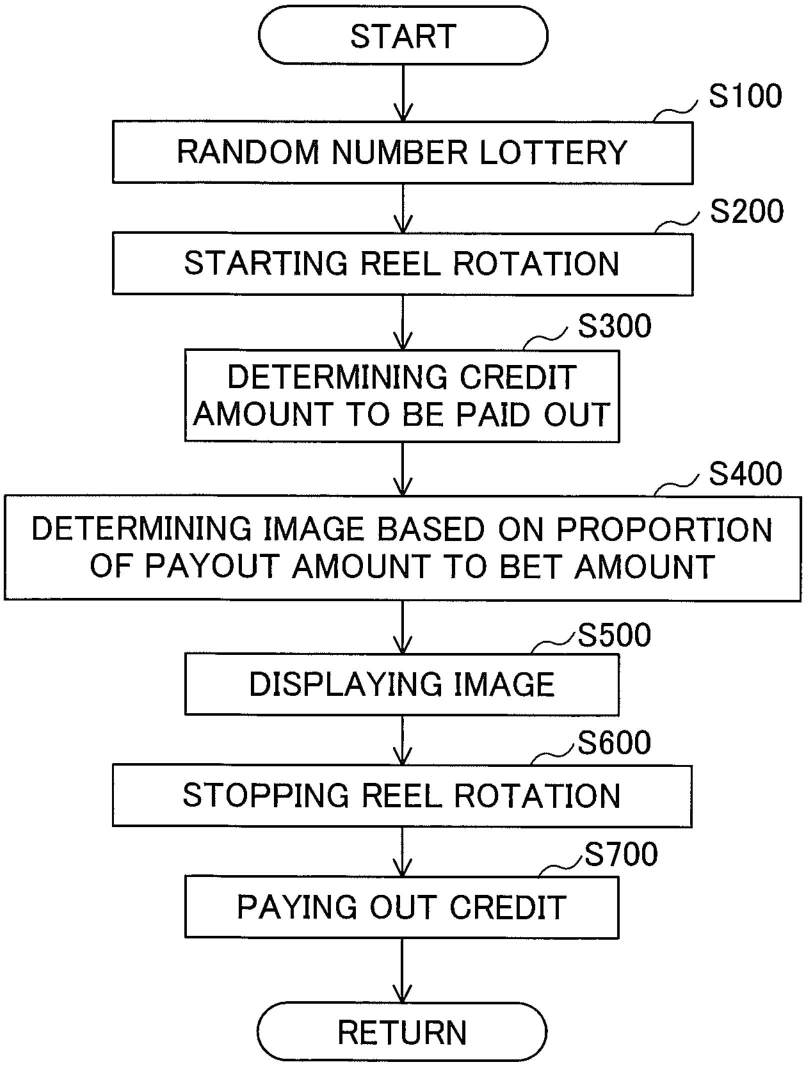
FIG. 1 is a flow chart showing the flow of a game executed in a slot machine according to a preferred embodiment of the present invention.

More specifically, as shown in FIG. 1, a CPU 106 is configured to perform the following steps: performing a lottery of random numbers in response to a bet accepted by the BET switch 23 (Step S100); submitting a signal for rotating the reels 3A to 3E to the motor driving circuit 120 (Step S200); determining a credit amount to be paid out to a player on the basis of a result of the lottery (Step S300); determining an image to be displayed on the liquid crystal display 30 on the basis of the proportion of a credit amount to be paid out to a bet amount accepted (Step S400); displaying the determined image on the liquid crystal display 30 (Step S500); submitting a signal for stopping the rotation of the reels 3A to 3E to the motor driving circuit 120 on the basis of the result of the lottery (S600); and paying out the credit amount to the player in response to the reels 3A to 3E having stopped rotating (Step S700). Details of these steps are later described.

Figure 2:
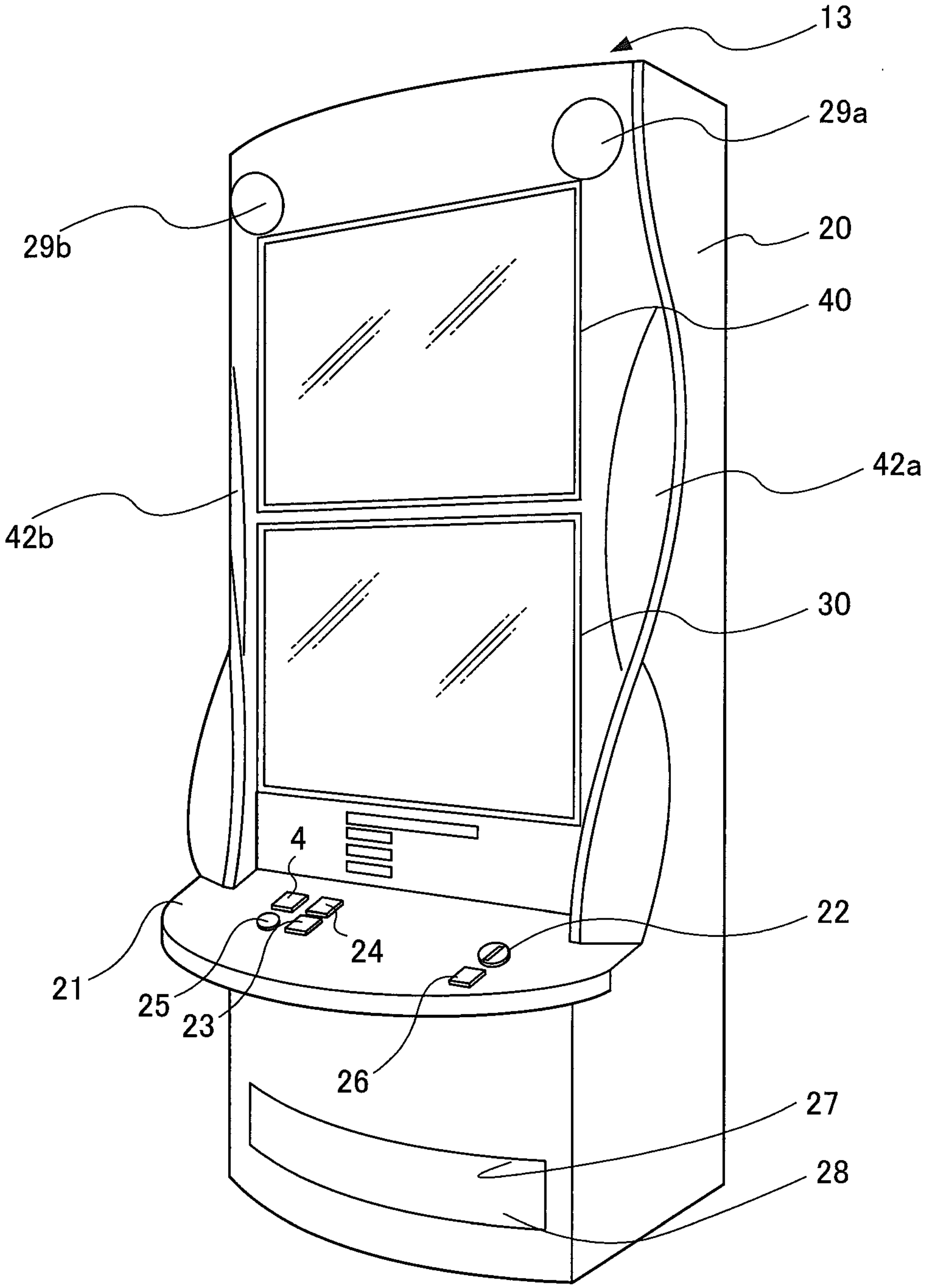
FIG. 2 is a perspective view showing the appearance of the slot machine according to the preferred embodiment of the present invention.

FIG. 2 is a perspective view showing the slot machine 13 according to an embodiment of the present invention. The slot machine 13 includes a cabinet 20. The cabinet 20 has a surface opening toward a player. The cabinet 20 contains various components including a game controller 100 (refer to FIG. 4) for electrically controlling the slot machine 13, and a hopper 44 (refer to FIG. 4) for controlling the insertion, storage, and payout of coins (game media), and the like. The game medium is not limited to coins, and it can be, for example, medals, tokens, electronic money, or electronic valuable information (credits) equivalent thereto.

A liquid crystal display 30 is disposed at substantially the center of the front face of the cabinet 20, and a liquid crystal display 40 is disposed above the display 30.

Figure 14:
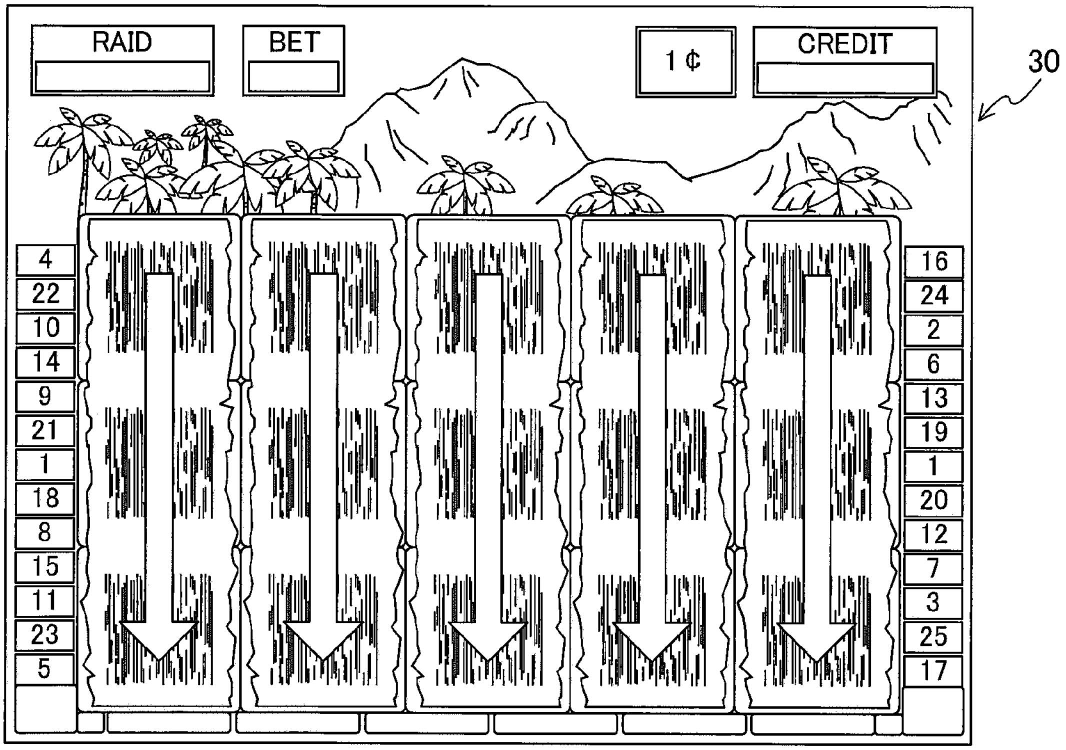
FIG. 14 is a diagram illustrating an example of a displayed screen of the slot machine according to the preferred embodiment of the present invention.
Figure 15:
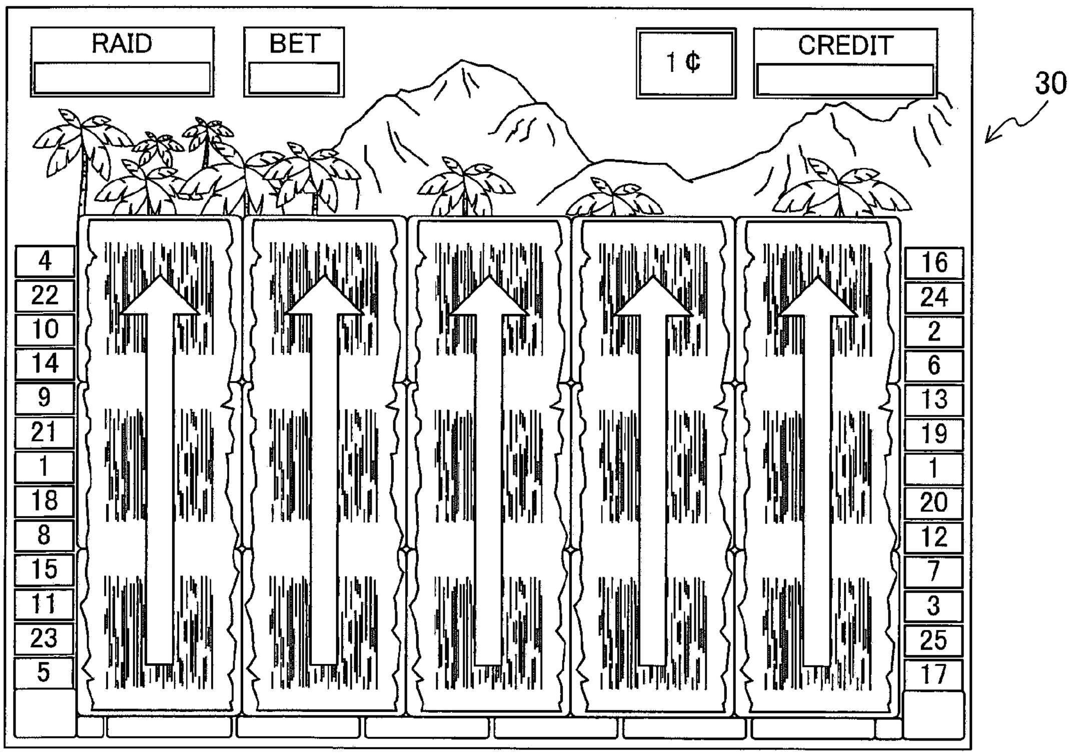
FIG. 15 is a diagram illustrating an example of a displayed screen of the slot machine according to the preferred embodiment of the present invention.
Figure 16:
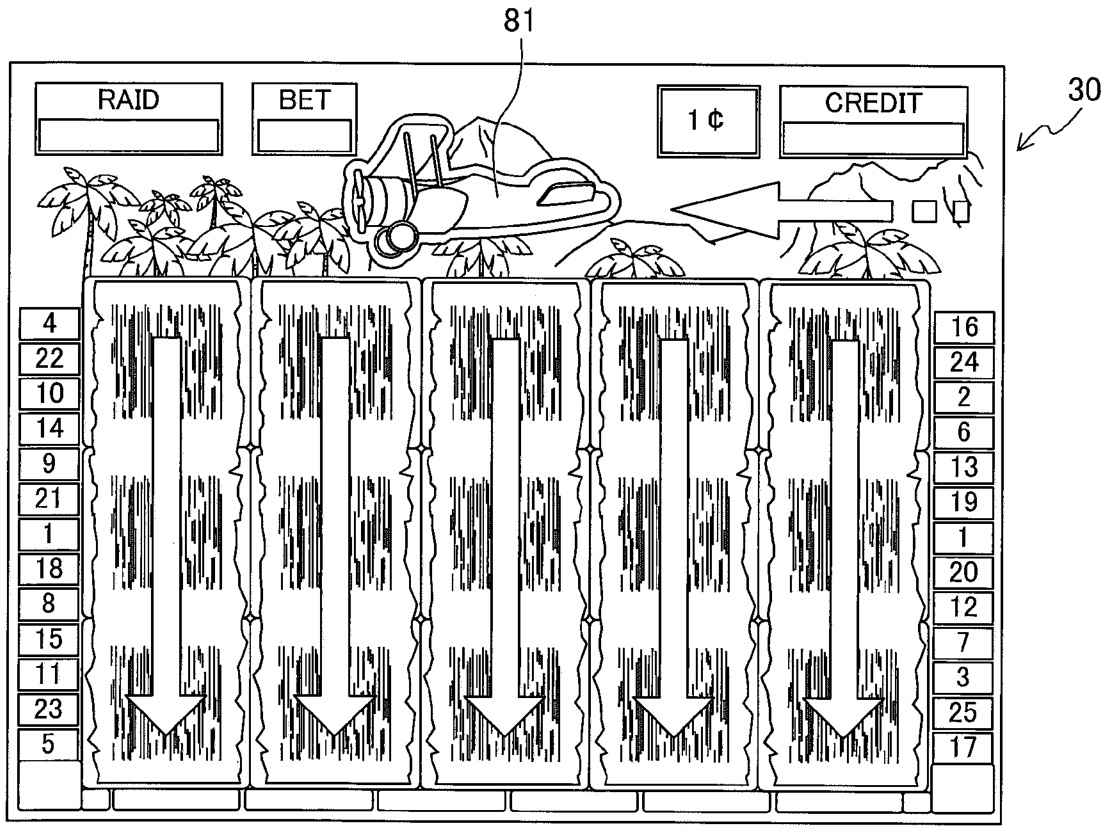
FIG. 16 is a diagram illustrating an example of a displayed screen of the slot machine according to the preferred embodiment of the present invention.

The liquid crystal display 30 is provided as a display device for displaying various kinds of images relating to a game such as rendered images. A player advances the game while observing the variety of images displayed on the liquid crystal display 30. In such a game, the liquid crystal display 30 displays a slot game as shown in FIGS. 14 to 16.

The slot machine 13 includes a video reel, which displays five virtual reels on the liquid crystal display 30. The term "a video reel" indicates that reels are displayed in the form of image on the liquid crystal display 30 in place of mechanical reels. The video reel displays a plurality of symbols necessary for the game such as "BONUS," "WILD," "TREASURE BOX," "GOLDEN MASK," "HOLY CUP," "COMPASS & MAP," "SNAKE," "A," "K," "Q," "J," and "10" in combination with the virtual image of rotating reels.

The other liquid crystal display 40 above the liquid crystal display 30 serves as a sub display for displaying the rules of the game, demonstration screens, and the like.

Sound transmission openings 29*a* and 29*b* are provided on both the left and right sides above the liquid crystal display 40, which allow the sound effects generated by a speaker 41 (see FIG. 4) to propagate outside the cabinet 20. Through the sound transmission openings 29*a* and 29*b*, the sound effects are delivered according to the advancement of the game. In addition, decoration lamps 42*a* and 42*b* are provided on both the left and right sides, substantially in the middle of the slot machine 13. The decoration lamps 42*a* and 42*b* emit light in accordance with the progress of the game.

A substantially horizontal operation unit 21 is disposed below the liquid crystal display 30. Furthermore, a coin slot 22, which allows a player to insert coins into the slot machine 13, is provided on the right side of the operation unit 21. On the other hand, the components lying on the left side of the operation unit 21 include: a BET switch 23 which allows the player to determine which lines are to be set to winning lines among nine lines L1, L2, L3, L4, L5, L6, L7, L8, and L9, for providing a prize described later (which are simply referred to as "winning lines" hereinafter), and which allows the player to select the number of coins as gaming media that are to be bet on the abovementioned winning lines; and a spin repeat bet switch 24 which allows the player to play another round of the game without changing the number of coins bet on the abovementioned winning lines during the immediately previous game. Such an arrangement allows the player to set the number of coins to be bet on the winning lines by pushing either the BET switch 23 or the spin repeat bet switch 24.

A start switch 25, which accepts operation for each game performed by the player to start a game, is disposed on the left side of the bet switch 23 on the operation unit 21. A pushing operation on either the start switch 25 or the spin repeat bet switch 24 triggers the start of the game, and the liquid crystal display 30 displays an image of the start of the rotation of the abovementioned five reels 3A through 3E.

On the other hand, a cash out switch 26 lies near the coin slot 22 on the abovementioned operation unit 21. When the player presses the cash out switch 26, the inserted coins are discharged from a coin discharge slot 27 that is opened in a lower part of the front face of the cabinet 20. The discharged coins are stored in a coin tray 28.

Figure 3:
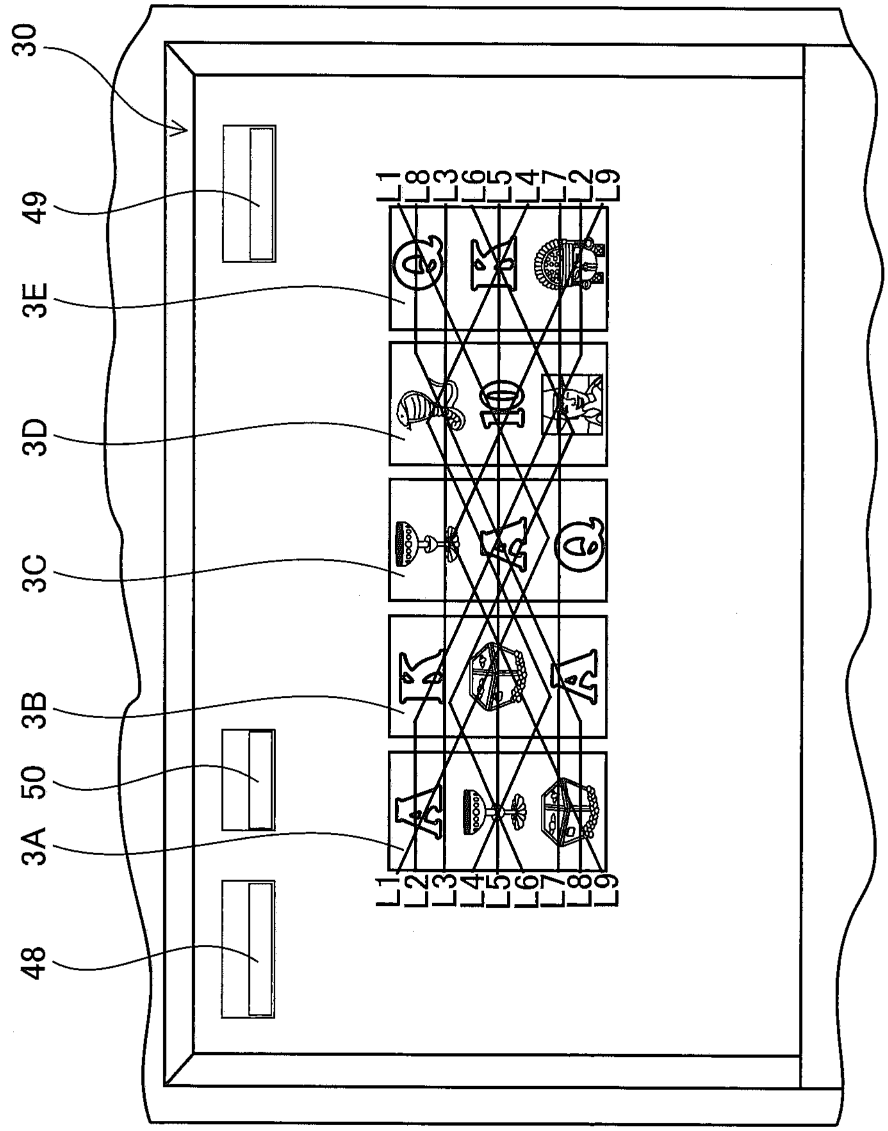
FIG. 3 is an enlarged front view showing a display region of the slot machine according to the preferred embodiment of the present invention.

FIG. 3 is an enlarged view showing the display region of the slot machine 13. As shown in FIG. 3, the slot machine 13 has nine lines L1 to L9 for providing awards. Each of the lines L1 to L9 is formed such that it extends so as to pass through one of the symbols on each of the reels 3A to 3E when the image of the rotating five reels 3A to 3E has stopped.

Pressing the bet switch 23 once activates, for example, the line L3 for providing a third award, the line L5 for providing a fifth award, and the line L7 for providing a seventh award, and also consumes a coin as a credit medal.

Pressing the bet switch 23 two times activates, for example, the line L1 for providing a first award, the line L4 for providing a fourth award, and the line L8 for providing an eighth award, in addition to the abovementioned three lines, and also consumes two coins as credit medals.

Pressing the bet switch 23 three times activates, for example, the line L2 for providing a second award, the line L6 for providing a sixth award, and the line L9 for providing a ninth award, in addition to the abovementioned six lines, and also consumes three coins as credit medals.

The game available in the present embodiment is a game in which a predetermined set of symbols are made along the winning lines.

A payout amount display unit 48, a bet amount display unit 50, and a credit amount display unit 49 are arranged to be displayed in this order from the left side on the upper portion of the liquid crystal display 30. The payout amount display unit 48 displays the payout amount of coins when a combination for providing an award is achieved along the winning lines. The credit amount display unit 49 displays the credit amount of coins stored in the slot machine 13. The bet amount display unit 50 displays the bet amount that is the number of coins bet on the winning lines.

Figure 4:
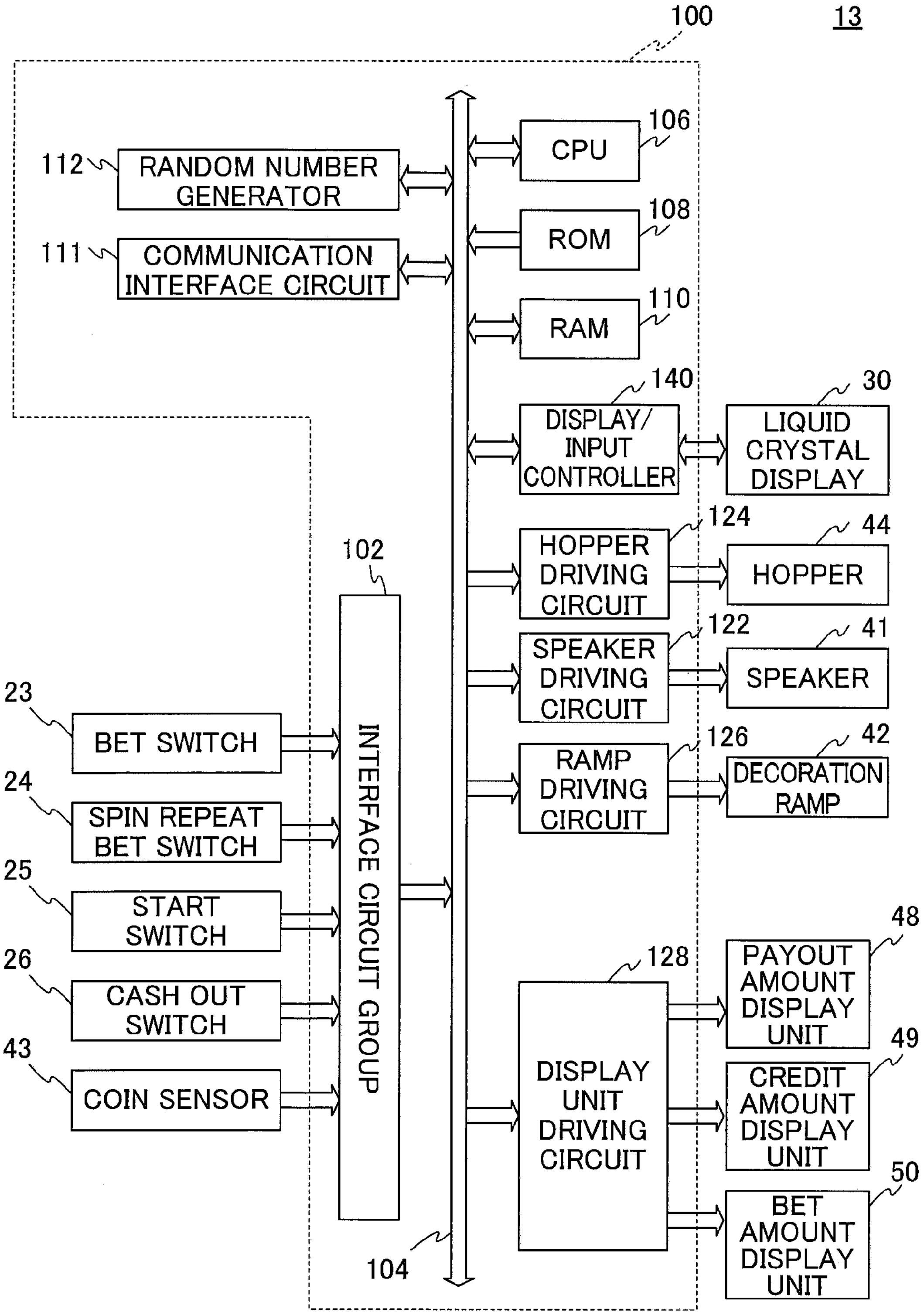
FIG. 4 is a block diagram of a controller of the slot machine according to the preferred embodiment of the present invention.

FIG. 4 is a block diagram showing the electrical configuration of the game controller 100 of the slot machine 13. As shown in FIG. 4, the game controller 100 of the slot machine 13 is a micro computer, and includes an interface circuit group 102, input/output bus 104, CPU 106, ROM 108, RAM 110, communication interface circuit 111, random number generator 112, speaker driving circuit 122, hopper driving circuit 124, lamp driving circuit 126, and display/input controller 140.

The interface circuit group 102 is connected to the input/output bus 104. The input/output bus 104 performs input/output of data signals or address signals to and from the CPU 106.

The start switch 25 is connected to the interface circuit group 102. A start signal output from the start switch 25 is converted to a predetermined signal by the interface circuit group 102, and is then supplied to the input-output bus 104.

The bet switch 23, the spin repeat bet switch 24, and the cash out switch 26 are also connected to the interface circuit group 102. Each of the switching signals output from these switches 23, 24, and 26 is also supplied to the interface circuit group 102, and is converted into a predetermined form of signal by the interface circuit group 102, and is then supplied to the input/output bus 104.

A coin sensor 43 is also connected to the interface circuit group 102. The coin sensor 43 is a sensor for detecting the coins inserted into the coin slot 22. The coin sensor 43 is provided in combination with the coin slot 22. A sensing signal outputted from the coin sensor 43 is also supplied to the interface circuit group 102 and converted into a predetermined signal by the interface circuit group 102, and is then supplied to the input/output bus 104.

The ROM 108 and the RAM 110 are connected to the input/output bus 104.

Upon acceptance of the start operation of a game by the start switch 25, the CPU 106 reads and executes a game program. The game program is programmed so as to: start displaying scrolling of the symbols on the five reels 3A to 3E on the liquid crystal display 30 via the display/input controller 140, and then statically display the five reels 3A to 3E for rearrangement; and, in a case where a combination of the statical symbols is displayed along the winning lines and the combination corresponds to a special combination for obtaining an award, pay out an amount of coins corresponding to the special combination.

Figure 9:
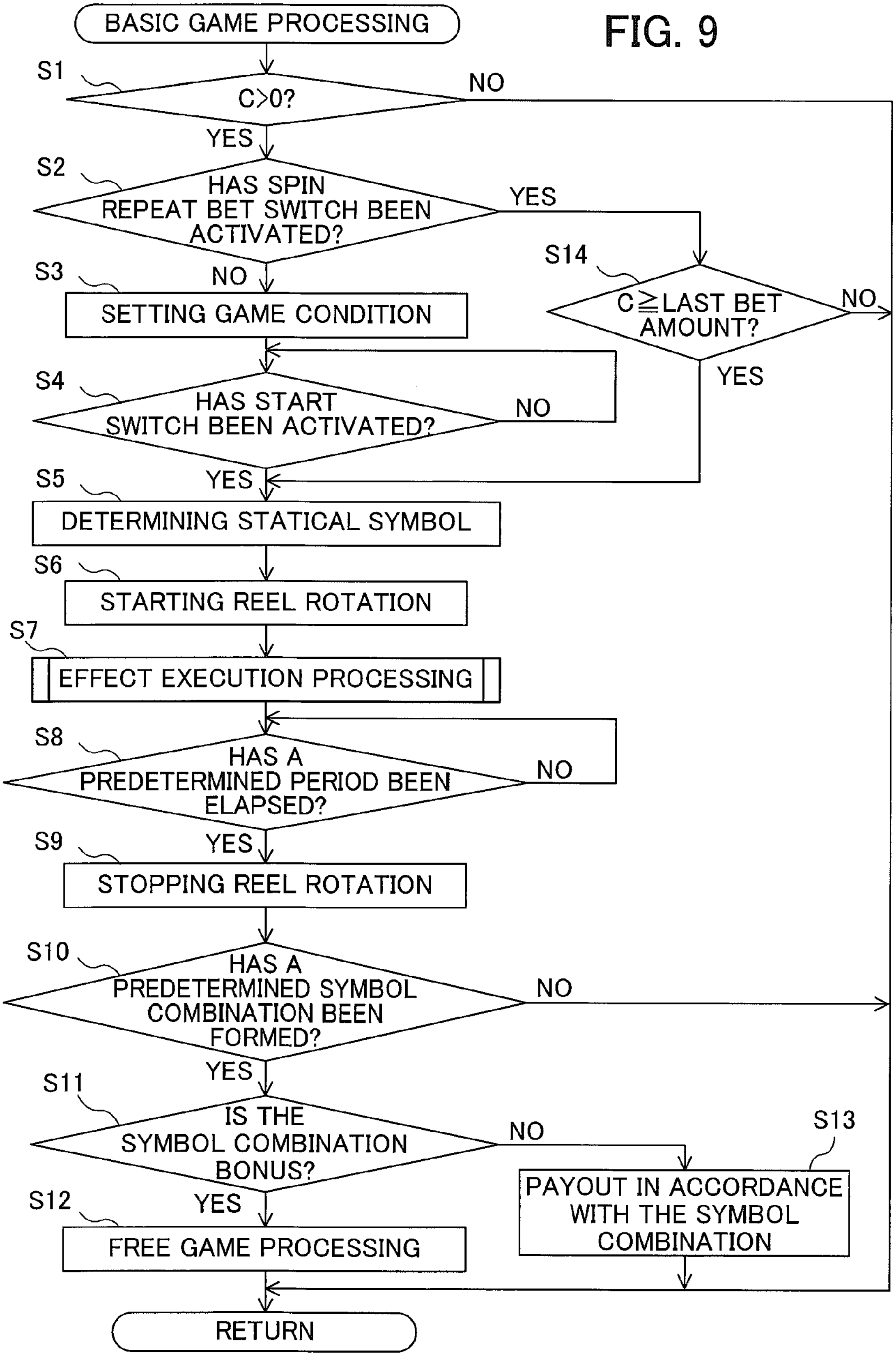
FIG. 9 is a diagram showing a flow of basic game processing executed in the slot machine according to the preferred embodiment of the present invention.
Figures 10, 11:
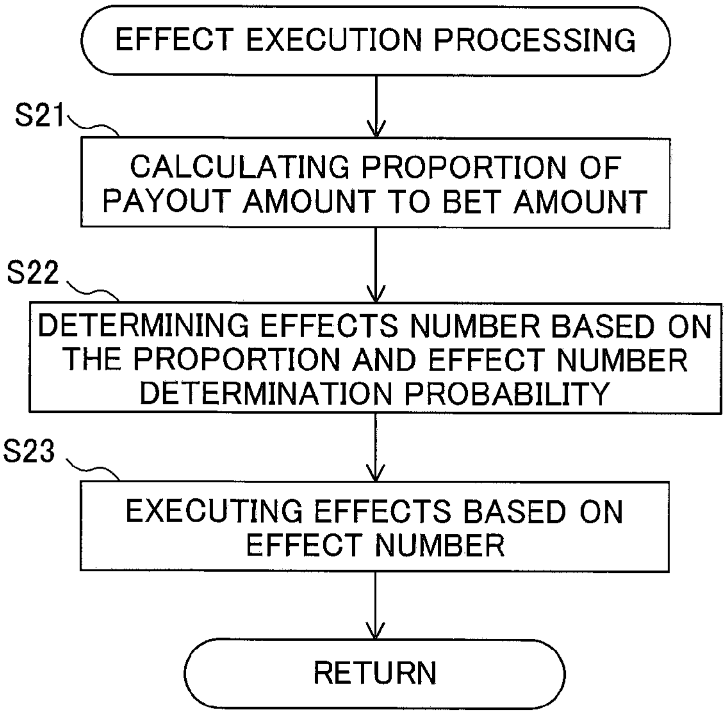
FIG. 10 is a diagram showing a flow of processing for executing rendered effects performed in the slot machine according to the preferred embodiment of the present invention.
FIG. 11 is a diagram showing a basic game payout table according to the preferred embodiment of the present invention.

The ROM 108 stores a control program for governing and controlling the slot machine 13, a program for executing routines as shown in FIGS. 9 and 10 (hereinafter referred to as a "routine execution program"), and initial data for executing the control program, and various data tables used in determination processes. The routine execution program includes the abovementioned game program. Examples of the data tables include tables such as those shown in FIGS. 11 and 13. The RAM 110 temporarily stores the values of flags and variables and the like used in the control program.

The game program includes a program module for determining a statical arrangement of symbols. The program module determines symbols (the code numbers corresponding to the symbols) to be arranged on the winning lines. The program module includes symbol weighting data corresponding to a plurality of payout ratios (for example, 80%, 84%, and 88%). The symbol weighting data represents relationship of correspondence between a code number (see FIG. 7) of each symbol and one or a plurality of random numbers included in a predetermined range (0 to 256), for each of the five reels 3A to 3E. The payout ratio is determined on the basis of payout ratio setting data stored in ROM 108. A symbol to be caused to stop is determined on the basis of the symbol weighting data, which corresponds to the payout ratio as described above.

The communication interface circuit 111 is also connected to the input/output bus 104. The communication interface circuit 111 is a circuit for communication with a central controller and the like over a network including a variety of LANs.

The random number generator 112 for generating random numbers is also connected to the input-output bus 104. The random number generator 112 generates random numbers included in a certain range of numerical values, for example, 0 to 65535 ($2^{16}-1$). Alternatively, the random numbers may be generated through arithmetic processing of the CPU 106.

The speaker driving circuit 122 for driving the speaker 41 is also connected to the input/output bus 104. The CPU 106 reads sound data stored in the ROM 108, and transmits the sound data to the speaker driving circuit 122 via the input/output bus 104. Thus, predetermined sound effects are output from the speaker 41.

The hopper driving circuit 124 for driving the hopper 44 is also connected to the input/output bus 104. Upon receipt of a cash out signal sent from the cash out switch 26, the CPU 106 transmits a driving signal to the hopper driving circuit 124 via the input/output bus 104. This enables the hopper 44 to discharge the number of coins corresponding to the currently remaining credits, which are stored in a predetermined memory area in the RAM 110.

Alternatively, the payout of the coins may be performed in a mode of storing credit data in a data card or the like, instead of using physical coins. That is to say, with such an arrangement, the player may have his/her own card, which serves as a storage medium. Upon the player inserting this card into the slot machine 13, the data relating to the credits is stored into the card.

The lamp driving circuit 126 is also connected to the input/output bus 104 for driving the decoration lamps 42*a* and 42*b*. The CPU 106 sends signals for driving the lamps 42*a* and 42*b* under a predetermined condition based on a program stored in the ROM 108, to the lamp driving circuit 126. This makes the decoration lamps 42*a* and 42*b* blink.

The display/input controller 140 is also connected to the input/output bus 104. The CPU 106 generates an instruction for displaying an image according to the state and the results of the game, and outputs the generated instruction to the display/input controller 140 via the input/output bus 104. Upon receipt of the instruction for displaying an image sent from the CPU 106, the display/input controller 140 generates a driving signal for driving the liquid crystal display 30 according to the instruction, and outputs the driving signal thus generated to the liquid crystal display 30. As a result, a predetermined image is displayed on the liquid crystal display 30. In addition, the display/input controller 140 transmits a signal received from the touch panel 32 touched by a player, which is provided on the liquid crystal display 30, to the CPU 106 via the input/output bus 104. It should be noted that the instruction for displaying an image includes instructions relating to the payout amount display unit 48, the credit amount display unit 49, and the BET amount display unit 50.

Figure 5:
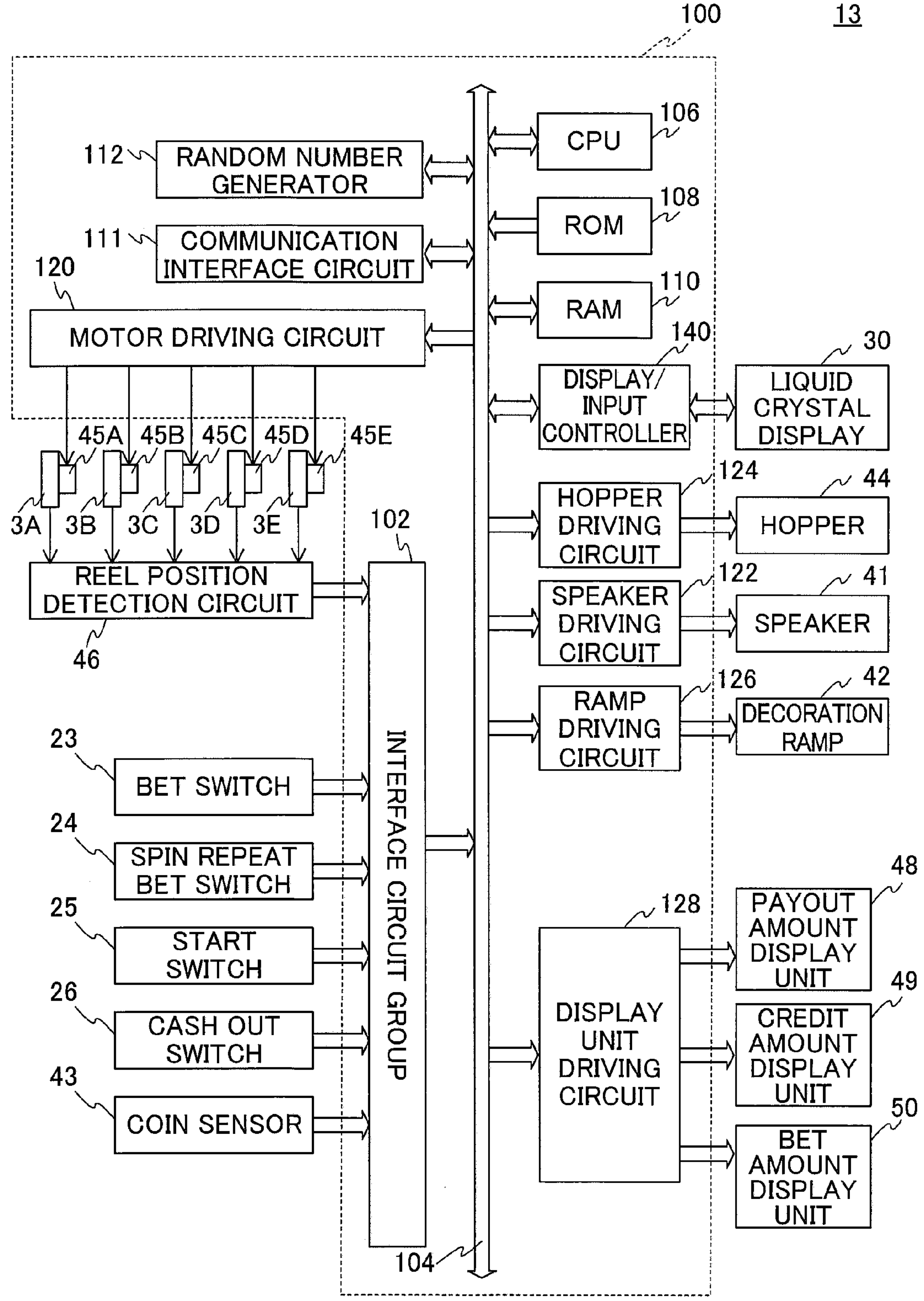
FIG. 5 is a block diagram of a controller of the slot machine according to the preferred embodiment of the present invention.

FIG. 5 is a block diagram showing the electrical configuration of a controller 100 of a slot machine 13 including mechanical reels. As shown in FIG. 5, the controller 100 of the slot machine 13 is a micro computer, and includes an interface circuit group 102, an input/output bus 104, CPU 106, ROM 108, RAM 110, communication interface circuit 111, random number generator 112, motor driving circuit 120, speaker driving circuit 122, hopper driving circuit 124, display unit driving circuit 128, and display/input controller 140. It should be noted that since the configuration shown in FIG. 5 is almost the same as the configuration with the video reels illustrated in FIG. 4 except for particular portions, a description is given of only these portions hereinafter.

A reel position detection circuit 46 is connected to the interface circuit group 102. The reel position detection circuit 46 detects the position of each of the mechanical reels 3A to 3E, according to pulse signals received from a reel rotation sensor (not shown). A detection signal from the reel position detection circuit 46 is also supplied to the interface circuit group 102 and converted into a predetermined signal, and is then supplied to the input/output bus 104 by the interface circuit group 102.

Upon acceptance of the start operation of a basic game by the start switch 25, the CPU 106 reads and executes a basic game program. The basic game program is programmed so as to: start the rotation of all of the mechanical reels 3A to 3E and scrolling of the symbols thereon, by driving stepping motors 45A to 45E; stop the rotation of all of the mechanical reels 3A to 3E and rearrange the symbols thereon, by stopping driving of the stepping motors 45A to 45E; and, in a case where a combination of the statical symbols is displayed along a winning line and the combination corresponds to a special combination for obtaining an award, pay out an amount of coins corresponding to the special combination.

The motor driving circuit 120 for driving the stepping motors 45A to 45E is also connected to the input/output bus 104. The CPU 106 controls the stepping motors 45A to 45E via the motor driving circuit 120, in response to an occurrence of a predetermined event.

Figure 6:
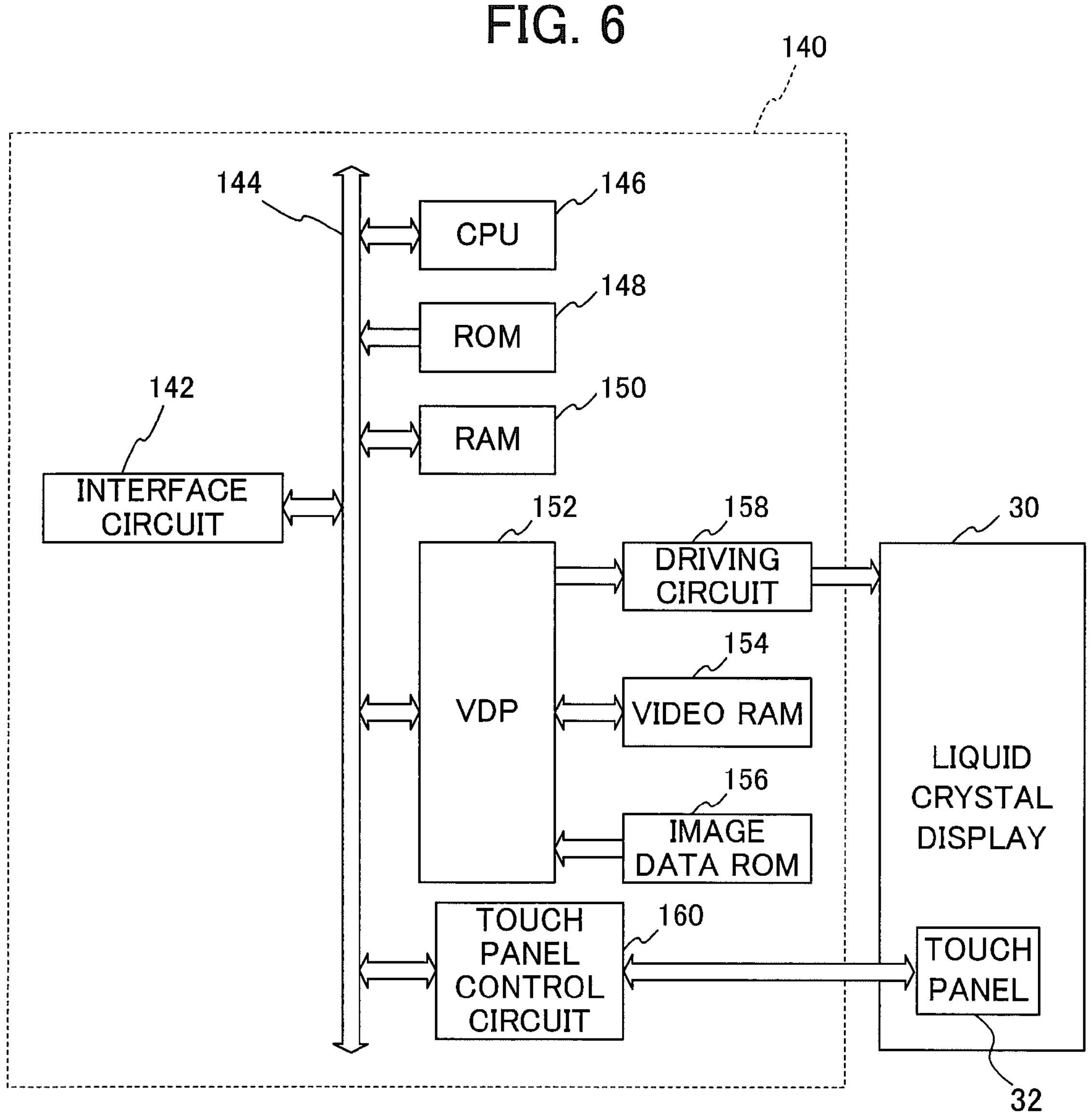
FIG. 6 is a block diagram of a display/input controller of the slot machine according to the preferred embodiment of the present invention.

FIG. 6 is a block diagram showing the electrical configuration of the display/input controller 140 of the slot machine 13. The display/input controller 140 of the slot machine 13 is a sub-microcomputer for performing image display processing and input control for the touch panel 32. The display/input controller 140 includes an interface circuit 142, input/output bus 144, CPU 146, ROM 148, RAM 150, VDP 152, video RAM 154, image data ROM 156, driving circuit 158, and touch panel control circuit 160.

The interface circuit 142 is connected to the input/output bus 144. An image display command delivered from the CPU 106 of the abovementioned game controller 100 is supplied to the input/output bus 144 via the interface circuit 142. The input/output bus 144 performs input/output of data signals or address signals to/from the CPU 146.

ROM 148 and RAM 150 are connected to the input/output bus 144. The ROM 148 stores a display control program for generating a driving signal, which is to be supplied to the liquid crystal display 30, according to an image display command received from the CPU 106 of the abovementioned game controller 100. On the other hand, the RAM 150 stores flags and values of variables used in the display control program.

The VDP 152 is also connected to the input/output bus 144. The VDP 152 is a processing device including a so-called sprite circuit, a screen circuit, a palette circuit and the like, and is capable of performing various processing for displaying an image on the liquid crystal display 30. The video RAM 154 and the image data ROM 156 are connected to the VDP 152. The video RAM 154 stores image data based on the image display instructions sent from the CPU 106 on the game controller 100. The image data ROM 156 stores various kinds of image data containing the abovementioned image effects data. Furthermore, the driving circuit 158 for outputting a driving signal for driving the liquid crystal display 30 is connected to the VDP 152.

By reading and executing the display control program stored in the ROM 148, the CPU 146 instructs the video RAM 154 to store image data to be displayed on the liquid crystal display 30 in response to the image display instructions sent from the CPU 106 on the game controller 100. The image display instructions include various types of instructions, such as the abovementioned instruction for displaying a rendered image.

The image data ROM 156 stores various kinds of image data including the rendered image data.

The touch panel control circuit 160 transmits the signals sent from the touch panel 32 provided on the liquid crystal display 30 to the CPU 106 via the input/output bus 144.

Figure 7:
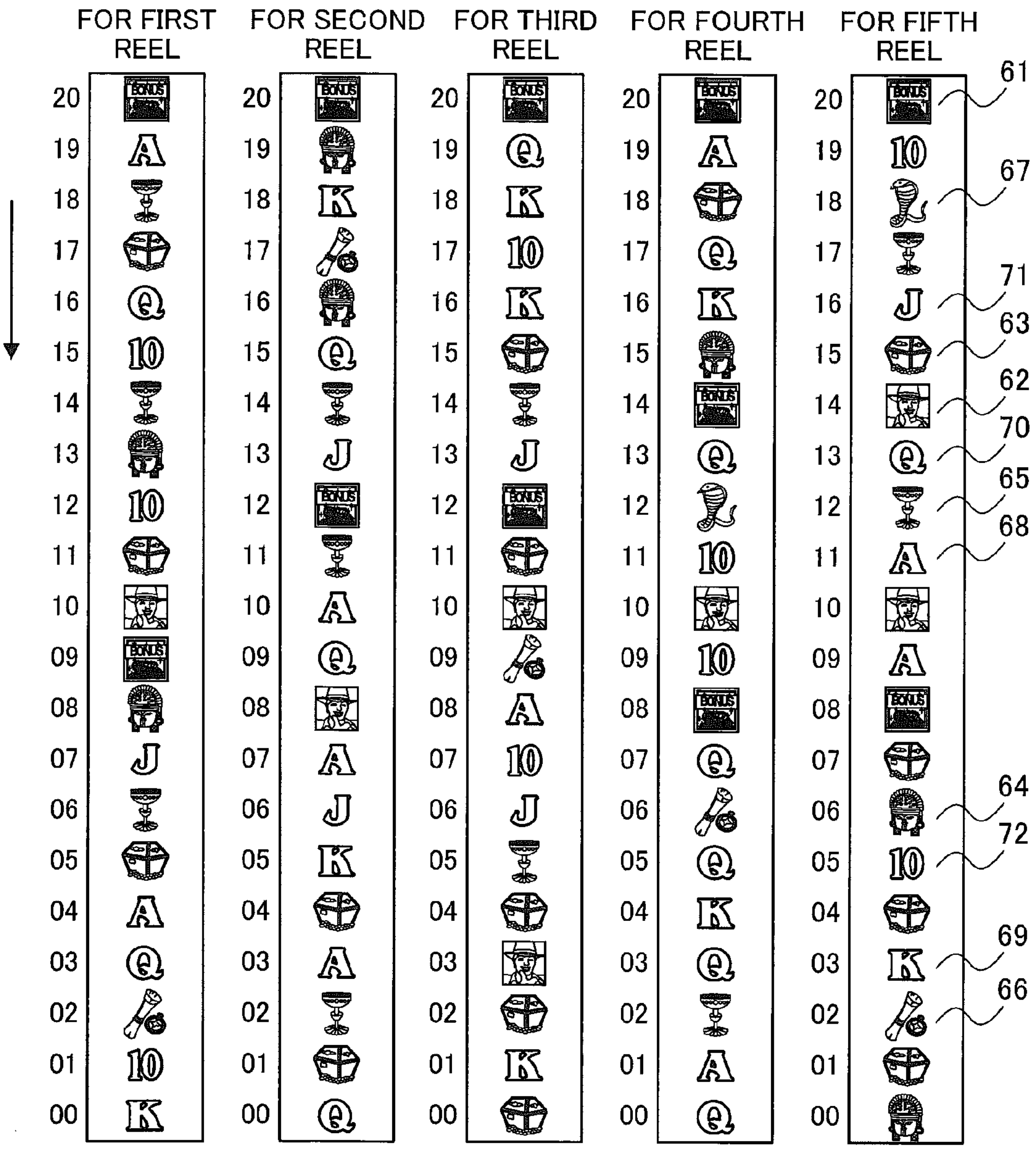
FIG. 7 is a diagram showing symbol columns displayed on each reel of the slot machine according to the preferred embodiment of the present invention.

FIG. 7 shows symbol sequences each including 21 symbols, which are depicted on the respective reels 3A to 3E. It should be noted that the symbol sequence for the first reel corresponds to the reel 3A, and similarly the symbol sequences for the second reel to the fifth reel correspond to the reels 3B to 3E, respectively.

As shown in FIG. 7, the code numbers "00" through "20" are assigned to the respective symbols of the symbol sequences for the reels 3A to 3E. The code numbers are stored (recorded) in the abovementioned ROM 108 (FIGS. 4 and 5) in the form of a data table.

A symbol sequence is depicted on each of the reels 3A to 3E. Each symbol sequence includes: a "BONUS" symbol (symbol 61) (which is simply referred to as "BONUS" hereinafter); a "WILD" symbol (symbol 62) (which is simply referred to as "WILD" hereinafter); a "TREASURE BOX" symbol (symbol 63) (which is simply referred to as "TREASURE BOX" hereinafter); a "GOLDEN MASK" symbol (symbol 64) (which is simply referred to as "GOLDEN MASK" hereinafter); a "HOLY CUP" symbol (symbol 65) (which is simply referred to as "HOLY CUP" hereinafter); a "COMPASS & MAP" symbol (symbol 66) (which is simply referred to as "COMPASS & MAP" hereinafter); a "SNAKE" symbol (symbol 67) (which is simply referred to as "SNAKE" hereinafter); an "A" symbol (symbol 68) (which is simply referred to as "A" hereinafter); a "K" symbol (symbol 69) (which is simply referred to as "K" hereinafter); a "Q" symbol (symbol 70) (which is simply referred to as "Q" hereinafter); a "J" symbol (symbol 71) (which is simply referred to as "J" hereinafter); and a "10" symbol (symbol 72) (which is simply referred to as "10" hereinafter). Each of the symbol sequences on the reels 3A to 3E is caused to visually move in a displayed video image in which the reels 3A to 3E are rotated in a forward direction.

In the present embodiment, "BONUS," "WILD," "SNAKE," "TREASURE BOX," "GOLDEN MASK," "HOLY CUP," "COMPASS & MAP," "A," "K," "Q," "J," and "10" are provided as hands entitled to obtaining a predetermined award. Basically, a hand (hand data) is control information that associates gains given to a player (the number of discharged coins) with winning symbol combinations, and is used for causing the reels 3A to 3E to stop, switching (shifting) the state of a game, and discharging coins.

FIG. 8 shows a symbol layout table. In the symbol layout table, the individual symbols on the reels 3A to 3E are registered in association with the code numbers designating the positions of the symbols in the aforesaid sequences of symbols, respectively. It should be noted that the first to fifth reels correspond to the reels 3A to 3E, respectively. In other words, the symbol layout table provides the symbol information with respect to the symbol positions (code numbers) on the reels 3A to 3E.

In FIG. 8, the abovementioned award types "TREASURE BOX," "GOLDEN MASK," and "COMPASS&MAP" are abbreviated as "TREASURE," "MASK," and "COMPASS," respectively.

The basic game processing is hereinafter described with reference to FIG. 9.

FIG. 9 is a flow chart showing the flow of processing in the basic game of the slot machine 13 to be executed by the game controller 100 of the slot machine 13. One routine shown in FIG. 9 corresponds to one round of game.

It is supposed that the slot machine 13 is activated in advance and the variables used in the CPU 106 on the game controller 100 are initialized to predetermined values, thereby providing steady operation of the slot machine 13.

It should be noted that rotational and statical display is described for a case where the reels 3A to 3E are video reels, in FIG. 9; however, the reels 3A to 3E can alternatively be mechanical reels.

First, the CPU 106 included in the abovementioned game controller 100 determines whether any credits, i.e. the coins inserted by the player, remain (Step S1). More specifically, the CPU 106 reads a credit amount C stored in the RAM 110, and performs the processing based upon the credit amount C thus read. If the credit amount C is "0" (NO in Step S1), the CPU 106 is not permitted to start a game. Accordingly, in this case, the CPU 106 ends this routine without performing any processing. On the other hand, if the credit amount C is at least "1" (YES in Step S1), the CPU 106 determines that there are remaining credits, and accordingly, advances to Step S2.

In Step S2, the CPU 106 determines whether a pushing operation has been performed on the spin repeat bet switch 24. If the spin repeat bet switch 24 has been pushed and the CPU 106 receives an operation signal from the spin repeat bet switch 24 (YES in Step S2), the CPU 106 advances to Step S14. On the other hand, if the CPU 106 does not receive an operation signal from the spin repeat bet switch 24 during a predetermined period of time (NO in Step S2), the CPU 106 determines that the spin repeat bet switch 24 has not been pushed, and accordingly, advances to Step S3.

In Step S3, the CPU 106 sets the game condition. More specifically, the CPU 106 determines the number of coins to be bet on the winning lines for the current game according to the user's operation via the BET switch 23. In this step, the CPU 106 receives an operation signal generated by the user's operation performed via the BET switch 23. The CPU 106 determines the BET amount for each winning line based upon the number of times the CPU 106 has received a BET switch operation signal, and stores the BET amount thus determined in the RAM 110. The CPU 106 reads out the credit amount C written in the RAM 110. Then, the CPU 106 subtracts the total bet amount, which is the sum total of the bet amounts, from the credit amount C thus read out, and stores the value thus calculated in the RAM 110. The CPU 106 then advances to Step S4.

In Step S4, the CPU 106 waits for operation of the start switch 25, while monitoring whether the start switch 25 is activated. If the start switch 25 has been activated and an operation signal is received from the start switch 25 (YES in Step S4), the CPU 106 determines that the start switch 25 has been activated, and advances to Step S5.

On the other hand, in Step S14, the CPU 106 determines whether the credit amount C is equal to or greater than the total bet amount in the previous game. In other words, the CPU 106 determines whether the player who has pushed the spin repeat bet switch 24 can start a game. More specifically, if the CPU 106 receives an operation signal from the spin repeat bet switch 24 that has been pushed, it reads out the credit amount C and the bet amount placed on each of the winning lines L1 to L9 in the previous game stored in the abovementioned RAM 110. Then, the CPU 106 determines whether the abovementioned credit amount C is equal to or greater than the total bet amount placed in the previous game. The CPU 106 performs processing according to the determination results. If the abovementioned credit amount C is less than the total bet amount placed on the previous game (NO in Step S14), the CPU 106 does not permit the start of a game, and accordingly, terminates this routine without performing any processing. On the other hand, if the CPU 106 determines that the abovementioned credit amount C is equal to or greater than the total bet amount bet in the previous game (YES in Step S14), the CPU 106 subtracts the total bet amount from the credit amount C, and stores the results of subtraction in the PAM 110. The CPU 106 then advances to Step S5.

In Step S5, the CPU 106 performs processing for determining a statical arrangement of symbols. The processing includes specific steps as described below.

The CPU 106 first selects random numbers in the range of 0 to 255, generated by the random number generator 112, which correspond to the five reels 3A to 3E. The CPU 106 then reads payout ratio setting data and causes the RAM 110 to store it. The CPU 106 retrieves symbol weighting data according to the payout ratio setting data, selecting five random numbers. Subsequently, the CPU 106 assigns code numbers to the reels 3A to 3E using the five random numbers selected (see FIG. 7). An assigned code number for each reel 3A to 3E corresponds to a code number for each symbol rearranged along the winning line L5. In this way, the CPU 106 determines a winning combination as a result of determining the code numbers for the respective reels 3A to 3E. In a case where the code numbers assigned to the reels 3A to 3E are "20," "20," "20" and "20," for example, this indicates that the CPU 106 determines a winning combination of "BONUS." In the present embodiment, at least three symbols of the same kind statically displayed along any one of the winning lines are entitled to an award.

After determining the symbols to come to rest along the winning lines, the CPU 106 determines whether the combination of the statical symbols matches any one of the special winning combinations. If the combination of the statical symbols matches a special winning combination, the CPU 106 activates a flag indicating an award to be provided in accordance with the special winning combination. The CPU 106 stores the activated flag in the RAM 110. On the other hand, if the combination of the statical symbols matches a combination other than the special winning combinations, in other words a losing combination, the CPU 106 does not activate the flag. The CPU 106 then advances to Step S6.

In Step S6, the CPU 106 displays a rotational image of reels 3A to 3E, and advances to Step S7. More specifically, the CPU 106 displays the rotational image of reels 3A to 3E, in which the reels 3A to 3E are rotated in a predetermined order or simultaneously, according to the symbol layout table stored in the RAM 110. In Step S7, the CPU 106 performs processing for executing rendered effects described in FIG. 10, and then advances to Step S8.

After displaying the rotational image of reels 3A to 3E, the CPU 106 waits for a predetermined period of time to elapse (Step S8). After the predetermined period of time has elapsed (at the moment of a YES determination in Step S8), the CPU 106 automatically stops the rotation of the reels 3A to 3E (Step S9). More specifically, in accordance with the special winning combination stored in the RAM 110, the CPU 106 displays an image of the reels 3A through 3E that come to rest in a predetermined order or simultaneously. In this display processing, the CPU 106 causes the statical symbols corresponding to the special winning combination determined in the abovementioned Step S5 to be placed within a display region, which is visually interactive with the player. The CPU 106 then advances to Step S10.

In Step S10, the CPU 106 determines whether a predetermined symbol combination has been formed based upon the results of the processing for determining a statical arrangement of symbols performed in Step S5. More specifically, the CPU 106 makes this determination based upon the state of the flag indicating whether to provide an award stored in the abovementioned RAM 110. If the flag has not been activated, in other words, if the symbol combination matches a combination other than the special winning combinations (NO in Step S10), the CPU 106 determines that a winning combination has not been formed, and terminates the routine. On the other hand, if the flag has been activated (in other words, if the symbol combination matches any one of the special winning combinations) (YES in Step S10), the CPU 106 advances to Step 11.

In Step S11, the CPU 106 determines whether the symbol combination formed in the processing for determining a statical arrangement of symbols of Step S5 is "BONUS". More specifically, if the symbol combination is "BONUS" (YES in Step S11), the CPU 106 advances to Step S12. On the other hand, if the symbol combination is not "BONUS" (NO in Step S11), the CPU 106 advances to Step S13.

In Step S12, the CPU 106 performs free game processing. The CPU 106 then terminates the present routine.

In Step S13, the CPU 106 pays out coins, the number of which corresponds to the special winning combination. More specifically, the CPU 106 calculates, with reference to a basic game payout table described in FIG. 11, the number of coins to be discharged for the abovementioned winning combination. The CPU 106 reads the credit amount stored in the RAM 110, and adds the calculated payout amount to the read credit amount, and then stores the resulting value in the RAM 110. The CPU 106 displays the value thus stored on the credit amount display unit 49. The CPU 106 then terminates the present routine.

The processing for executing effects is hereinafter described with reference to FIG. 10.

The CPU 106 first calculates a proportion of a payout amount to a bet amount (Step S21). More specifically, the CPU 106 first calculates the payout amount by referencing the basic game payout table (described later with reference to FIG. 11), on the basis of the combination of symbols formed in the processing for determining a statical arrangement of symbols of Step S5 of FIG. 9. The CPU 106 then calculates the proportion of the payout amount to the bet amount, in other words, how many times the payout amount is as large as the bet amount, by dividing the payout amount by the bet amount. After Step S21, the CPU 106 advances to Step S22.

In Step S22, the CPU 106 determines an effect number on the basis of the calculated proportion and a probability for determining an effect number, and then advances to Step S23. More specifically, the CPU 106 determines the effect number by referencing an effect number determination table (described later with reference to FIG. 12), on the basis of the proportion calculated in Step S21 and a random number generated by the random number generator 112.

In Step S23, the CPU 106 performs processing of providing rendered effects on the basis of the effect number. More specifically, the CPU 106 searches an effect table (described later with reference to FIG. 13) with the effect number determined in Step S22 for a mode of rendered effects, and then causes the liquid crystal display 30 via the display/input controller 140 to display an image of rendered effects corresponding to the mode of rendered effects. After this processing, the CPU 106 advances to Step S8 of FIG. 9.

The basic game payout table is described with reference to FIG. 11.

In the basic game payout table, each symbol combination is associated with the number of coins to be discharged for each bet amount during one game. If a combination of symbols "WILD" occurs during the determination of a symbol combination, 200 coins are discharged for a bet amount of "1", 400 coins for a bet amount of "2", and 600 coins for a bet amount of "3".

In a case where a plurality of winning combinations are formed, a combination of "MASK" on the winning line L5 and a combination of "HOLY CUP" on the winning line L9 for a bet amount of "3", for example, 300 coins in total (150 for the "MASK" and 150 for "HOLY CUP") are discharged.

The effect number determination table is described hereinafter with reference to FIG. 12.

The effect number determination table is used for determining the effect number indicating the type of rendered effects depending on a result of a random number lottery. In this table, the probability applied to selection of an effect number differs according to the proportion of a payout amount to a bet amount.

For a case where the proportion is 100, for example, the probabilities selected for the effect numbers "1", "2", and "3" are 10%, 20%, and 70%, respectively.

Since the type of rendered effects is determined not only by the proportion of a payout amount to a bet amount, but further by a result of the random number lottery, the slot machine according to the present invention implements a greater variety of rendered effects. This does not allow players to fully grasp their coming gains. The players, therefore, have another fun of predicting their gains.

The effect table is described hereinafter with reference to FIG. 13.

The effect table is a table that the CPU 106 searches with the effect number determined above so as to determine the mode of rendered effects. For example, for a case where the determined effect number is "2", the mode of rendered effects is set to "UPWARD SPIN".

Display examples of the modes of rendered effects are described hereinafter with reference to FIGS. 14 to 16.

FIG. 14 is a diagram showing a display example of the mode of rendered effects "NORMAL SPIN" corresponding to the effect number 1. According to FIG. 14, the reels 3A to 3E rotate downward at the beginning of a game.

FIG. 15 is a diagram showing a display example of the mode of rendered effects "UPWARD SPIN" corresponding to the effect number 2. According to FIG. 15, the reels 3A to 3E rotate upward at the beginning of a game.

FIG. 16 is a diagram showing a display example of the mode of rendered effects "FLYING AIRPLANE" corresponding to the effect number 3. According to FIG. 16, the reels 3A to 3E rotate downward and an airplane 81 passes by, following the start of a game.

It should be noted that the modes of rendered effects are "NORMAL SPIN", "UPWARD SPIN" and "FLYING AIRPLANE" according to the present embodiment; however, it may be possible that more than three modes are introduced.

In addition, the proportions of a payout amount to a bet amount are 200, 100, 50, 10, 2 and 1 in the present embodiment; however, it may alternatively be possible to adopt other proportions.

Furthermore, a slot machine without stop buttons, which automatically stops rotation of reels (a so-called casino machine), has been explained in the present embodiment; however, the present invention can also be applied to a slot machine with stop buttons, which stop rotation of reels in the order of detected pushing operation (a so-called pachi-slot machine).

While the preferred embodiment of the present invention has been described above, it is apparent to one skilled in the art that various changes and modifications can be made without departing from the appended claims.

What is claimed is:

1. A slot machine comprising:

a display device;

plurality of reels each having a plurality of symbols on a circumferential surface thereof;

a bet unit for accepting a bet placed on a game by a player;

a plurality of motors for rotationally driving and causing the plurality of reels to come to a stop, respectively;

a memory for storing the bet accepted by the bet unit; and a controller configured:

(a) to execute a first lottery in response to the bet accepted by the bet unit;

(b) to send a signal indicating an instruction for rotationally driving each of the plurality of reels to each of the plurality of motors;

(c) to determine an amount of credits to be awarded to the player in accordance with a result of the first lottery;

(d) to calculate a proportion of the amount of credits to the bet by dividing the amount of credits to be awarded to the player determined at step (c) by the bet accepted by the bet unit at step (a) during executing the game;

(e) to cause the display device to display an image, wherein the image provides a graphical indication of the proportion calculated in (d) and changes according to the proportion calculated in (d); and wherein the image is selected from a plurality of images based on a result of a second lottery, a probability applied to the second lottery differs according to the proportion calculated in (d);

(f) to send a signal indicating an instruction for causing each of the plurality of reels to come to a stop to each of the plurality of motors in accordance with the result of the first lottery; and (g) when each of the plurality of reels comes to a stop, to award the amount of credits determined in (c) to the player.

2. A slot machine comprising:

a display device for performing rotational display and statical display of a plurality of symbols;

a bet unit for accepting a bet placed on a game by a player;

a memory for storing the bet accepted by the bet unit; and a controller configured:

(a) to execute a first lottery in response to the bet accepted by the bet unit;

(b) to cause the display device to perform the rotational display of the plurality of symbols;

(c) to determine an amount of credits to be awarded to the player in accordance with a result of the first lottery;

(d) to calculate a proportion of the amount of credits to the bet by dividing the amount of credits to be awarded to the player determined at step (c) by the bet accepted by the bet unit at step (a) during executing the game;

(e) to cause the display device to display an image, wherein the image provides a graphical indication of the proportion calculated in (d) and changes according to the proportion calculated in (d); and wherein the image is elected from a plurality of images based on a result of a second lottery, a probability applied to the second lottery differs according to the proportion calculated in (d);

(f) to cause the display device to perform the statical display of the plurality of symbols in accordance with the result of the first lottery; and (g) when the plurality of symbols comes to a stop, to award the amount of credits determined in (c) to the player.

* * * * *